(12) United States Patent
Himmelmann et al.

(10) Patent No.: US 8,191,571 B2
(45) Date of Patent: Jun. 5, 2012

(54) FLUID CIRCUIT BREAKER QUICK DISCONNECT COUPLING

(75) Inventors: Richard A. Himmelmann, Beloit, WI (US); Joshua Boeck, Berlin, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 964 days.

(21) Appl. No.: 12/182,284

(22) Filed: Jul. 30, 2008

(65) Prior Publication Data

US 2010/0024894 A1 Feb. 4, 2010

(51) Int. Cl.
*F16K 15/00* (2006.01)

(52) U.S. Cl. .................. 137/521; 137/504; 137/513.3; 138/46; 251/212

(58) Field of Classification Search .............. 137/460, 137/469, 498, 513.3, 513.5, 517, 518, 521, 137/456, 470; 138/46, 45; 251/212, 283
See application file for complete search history.

(56) References Cited

U.S. PATENT DOCUMENTS

| | | | |
|---|---|---|---|
| 996,127 A | 6/1911 | Patnaude | |
| 1,703,311 A | 2/1929 | Litle, Jr. | |
| 2,518,299 A | 8/1950 | Fernandez | |
| 2,894,377 A | 7/1959 | Shikles, Jr. | |
| 3,042,926 A * | 7/1962 | Shepard | 2/2.14 |
| 3,720,208 A * | 3/1973 | Aldrich et al. | 128/201.27 |
| 3,842,614 A | 10/1974 | Karcher et al. | |
| 3,895,646 A * | 7/1975 | Howat | 137/468 |
| 3,905,390 A * | 9/1975 | Pysh | 137/518 |
| 3,958,605 A * | 5/1976 | Nishizu et al. | 138/46 |
| 4,067,540 A * | 1/1978 | Slade | 251/63.4 |
| 4,069,686 A | 1/1978 | Hoelman | |
| 4,222,408 A * | 9/1980 | Slaughter, Jr. | 137/518 |
| 4,456,029 A * | 6/1984 | McCrum | 137/498 |
| 4,459,822 A | 7/1984 | Pasternack | |
| 4,633,900 A * | 1/1987 | Suzuki | 137/504 |
| 5,185,899 A | 2/1993 | Urbani | |
| 5,261,482 A | 11/1993 | Lomax et al. | |
| 5,340,291 A * | 8/1994 | Benckert et al. | 417/569 |
| 5,392,844 A | 2/1995 | Lomax et al. | |
| 5,592,966 A * | 1/1997 | Gates | 137/513.5 |
| 6,349,412 B1 | 2/2002 | Dean | |
| 6,435,009 B1 | 8/2002 | Tilley | |
| 6,848,297 B2 | 2/2005 | Tilley | |
| 7,114,519 B2 * | 10/2006 | Aitchison et al. | 137/518 |
| 7,140,234 B2 | 11/2006 | Tilley | |
| 7,252,644 B2 | 8/2007 | Dewald et al. | |
| 7,262,385 B2 | 8/2007 | Fuson | |
| 7,343,783 B2 | 3/2008 | Tilley | |
| 2005/0016594 A1* | 1/2005 | Moesby et al. | 137/498 |
| 2008/0035222 A1* | 2/2008 | Fraser | 137/614.04 |

* cited by examiner

*Primary Examiner* — John Rivell
*Assistant Examiner* — Matthew W Jellett
(74) *Attorney, Agent, or Firm* — Carlson, Gaskey & Olds, PC

(57) ABSTRACT

A fluid circuit breaker includes a plurality of petals and a bias system attached to the plurality of petals to maintain the plurality of petals at a closed unobstructed flow condition below a predetermined flow velocity.

19 Claims, 5 Drawing Sheets

FLUID CIRCUIT BREAKER QUICK DISCONNECT COUPLING

BACKGROUND

The present application relates to quick disconnect couplings, and more particularly to a quick disconnect coupling with a fluid circuit breaker.

Quick disconnect couplings permit fluid flow lines to quickly couple and de-couple. One type of conventional quick disconnect coupling incorporate a spring-loaded poppet valve on each connector half to stop the fluid from flowing when the two halves are separated. When the two connector halves are pushed together, spring-loaded poppet valves move against the bias force of a spring from the sealed position to an open flow position.

Spring-loaded poppet valves typically require a relatively large package envelope, yet the diameter of the fluid flow path through the valve is smaller than the overall diameter of the coupling. A relatively large pressure drop occurs between the valve halves for a given size and flow rate when compared to a similarly sized unobstructed flow path. This phenomenon occurs because the flow is required to pass between the poppet and the valve housing which may result in an area with high fluid velocity and high turbulence.

Although spring-loaded poppet valves have a relatively large pressure drop, this pressure drop will slow depressurization of the pressurized system to provide a user time to disconnect a severed hose and avoid rapid depressurization.

More current quick disconnect couplings allow the working fluid to flow at a design flow rate in either direction with an ultra-low pressure drop. Although effective, current quick disconnect couplings may require an inhibitor to minimize rapid depressurization.

SUMMARY

A fluid circuit breaker according to an exemplary aspect of the present invention includes a plurality of petals and a bias system attached to the plurality of petals to maintain the plurality of petals at a closed un-obstructed flow condition below a predetermined flow velocity.

A quick disconnect coupling according to an exemplary aspect of the present invention includes: a support structure mounted to a conduit. A plurality of petals movable between an open obstructed flow condition and a closed un-obstructed flow condition relative to the support structure. A bias system attached to the plurality of petals to maintain the plurality of petals at the closed unobstructed flow condition below a predetermined flow velocity.

A method of minimizing rapid depressurization of a pressurized system according to an exemplary aspect of the present invention includes opening a plurality of petals against a bias system in response to a fluid flow above a predetermined flow velocity.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
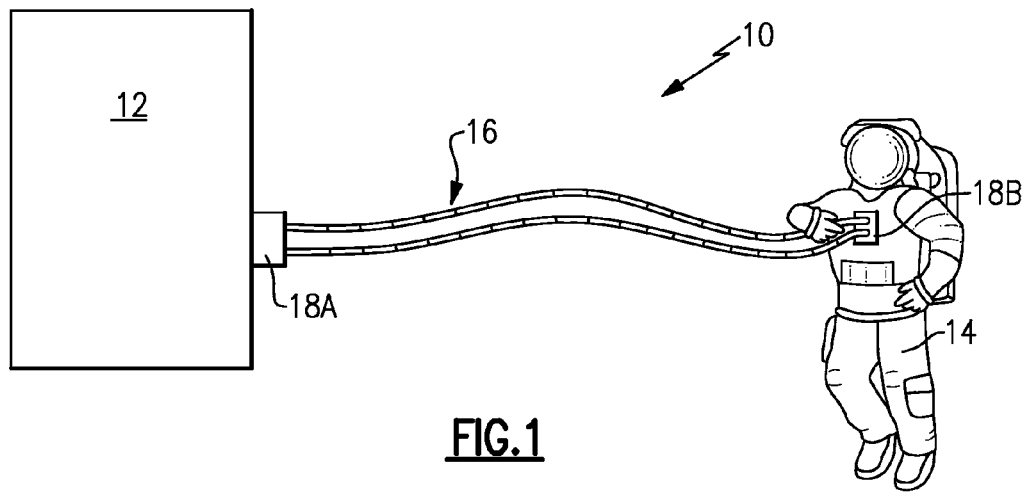
FIG. 1 is a general schematic block diagram view of a pressurized system.

FIG. 1 schematically illustrates a pressurized system 10. The system 10 includes a source 12 which pressurizes an object 14 through a hose system 16. The hose system 16 includes a quick disconnect coupling 18A and 18B to attach the hose system 16 to the source 12 and the object 14. The quick disconnect couplings 18A, 18B allow working fluid such as, for example, air or oxygen, to flow at a design flow rate in either direction, with an ultra-low pressure drop. Although a specialized space suite is disclosed in the illustrated non-limiting embodiment, it should be understood that the quick disconnect coupling 18A and 18B may be utilized in various applications and environments.

Figure 2:
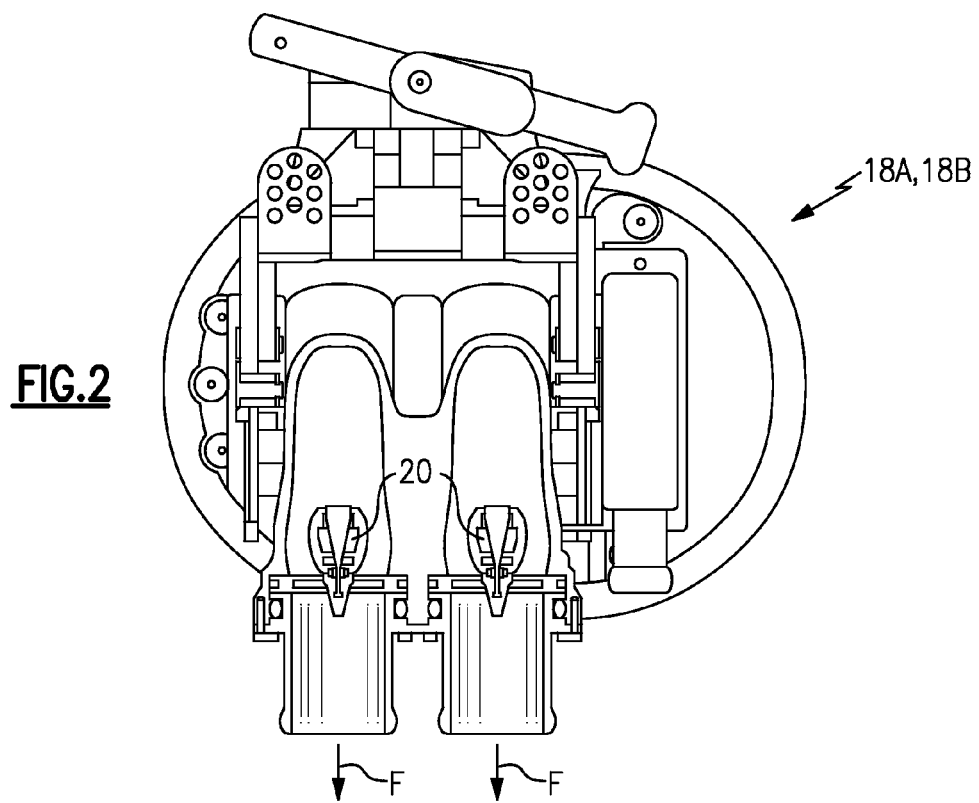
FIG. 2 is an expanded view of a quick disconnect coupling with a fluid circuit breaker.

Referring to FIG. 2, the hose system 16 includes a fluid circuit breaker 20. In one non-limiting embodiment, the fluid circuit breaker 20 is incorporated into each of the quick disconnect couplings 18A, 18B. It should be understood that the fluid circuit breaker 20 may be located in any system component.

Figure 3:
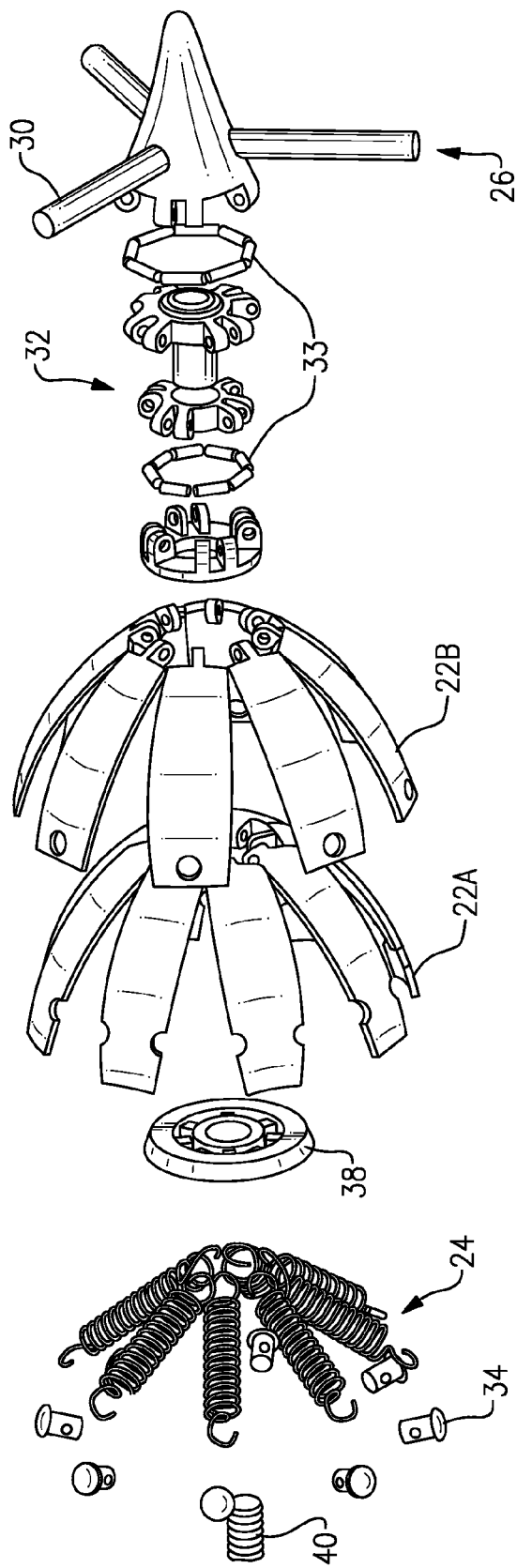
FIG. 3 is an exploded view of a fluid circuit breaker.

Referring to FIG. 3, the fluid circuit breaker 20 generally includes a plurality of petals 22 defined about an axis X, a bias system 24 attached to the plurality of petals 22 and a support structure 26. The fluid circuit breaker 20 is mounted within a two-piece conduit 28A, 28B (FIGS. 3A and 3B) through a strut 30 attached to the support structure 26. The fluid circuit breaker 20 is of a circumferential airfoil or teardrop shape relative a fluid flow direction F.

Figure 4:
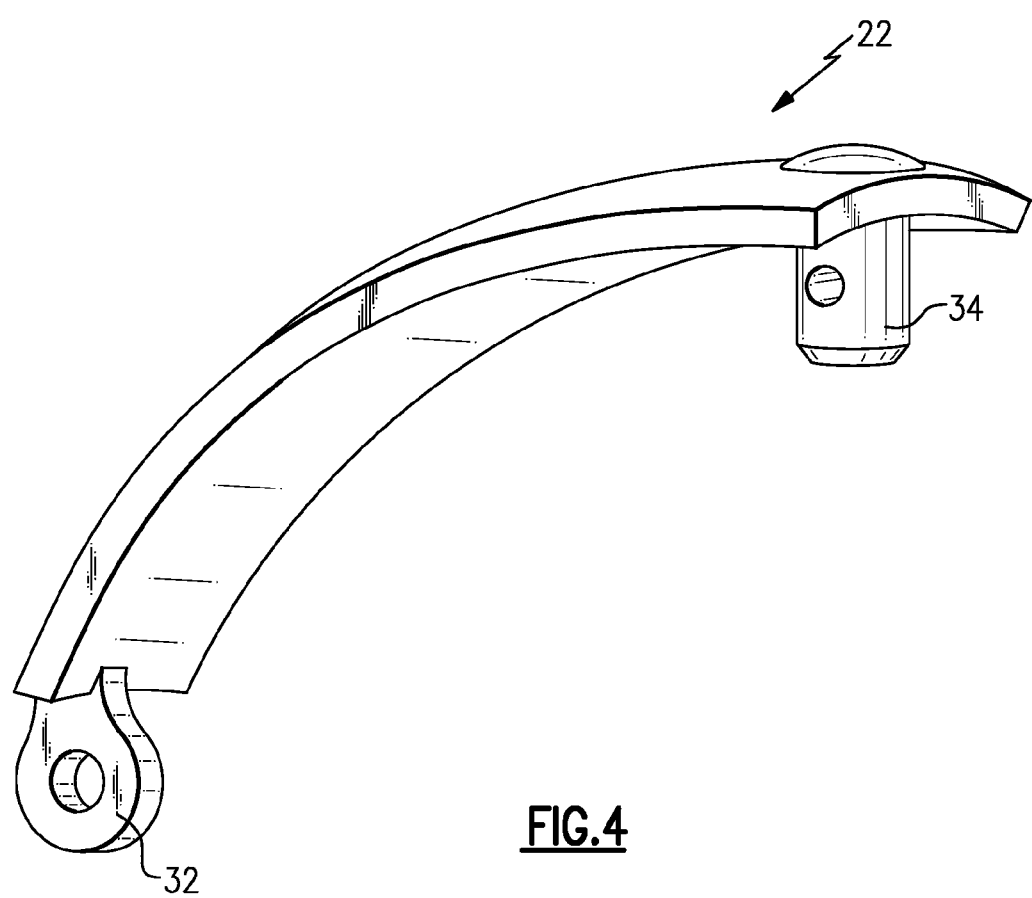
FIG. 4 is an expanded perspective view of a single outboard petal of the fluid circuit breaker.

Each of the plurality of petals 22 are of an arcuate aerodynamic shape (FIG. 4). The aerodynamic shape facilitates airflow around the fluid circuit breaker 20 below a predetermined flow velocity but generates lift above the predetermined flow velocity. Each of the plurality of petals 22 are supported by a pivot system 32 having a pivot pin 33 located at a downstream end section and a spring attachment 34 at and upstream end section. Each of the plurality of petals 22 are pivotally attached to the support structure 26 at the pivot 32.

The bias system 24, in one non-limiting embodiment, includes a plurality of springs 36 attached to a spring base 38. The spring base 38 is attached to the support structure 26 though a fastener 40. The bias system 24 permits the plurality of petals 22 to move between a closed un-obstructed flow condition (FIG. 3A) and an open obstructed flow condition (FIG. 3B). The open obstructed flow condition occurs above a predetermined flow velocity such that the plurality of petals 22 and the closed un-obstructed flow condition occurs below the predetermined flow velocity. In the closed un-obstructed flow condition, the plurality of petals 22 define a generally tear-drop open cup shape which reduces the pressure drop of the circuit breaker during the nominal flow condition.

The plurality of petals 22 are generally divided into an inboard set 22A and an outboard set 22B. Each petal of the outboard set 22B include the spring attachment 34 and each petal of the inboard set 22A includes cut-outs 42 adjacent the upstream end section to receive the spring attachment 34 of the outboard set when in the closed un-obstructed flow condition (FIG. 3A).

Figure 3A:
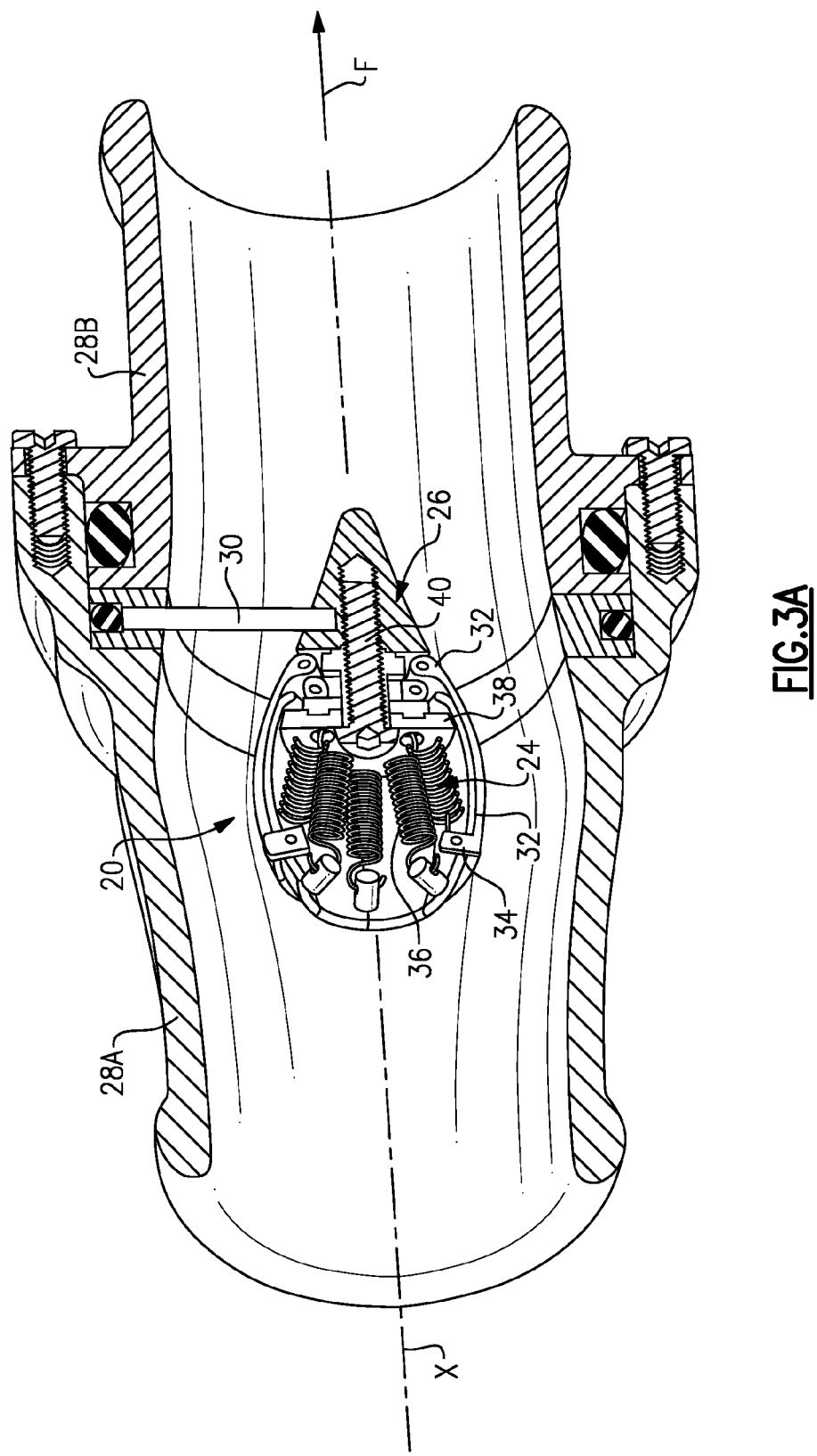
FIG. 3A is a perspective longitudinal sectional view of a fluid circuit breaker in a closed unobstructed flow condition.
Figure 3B:
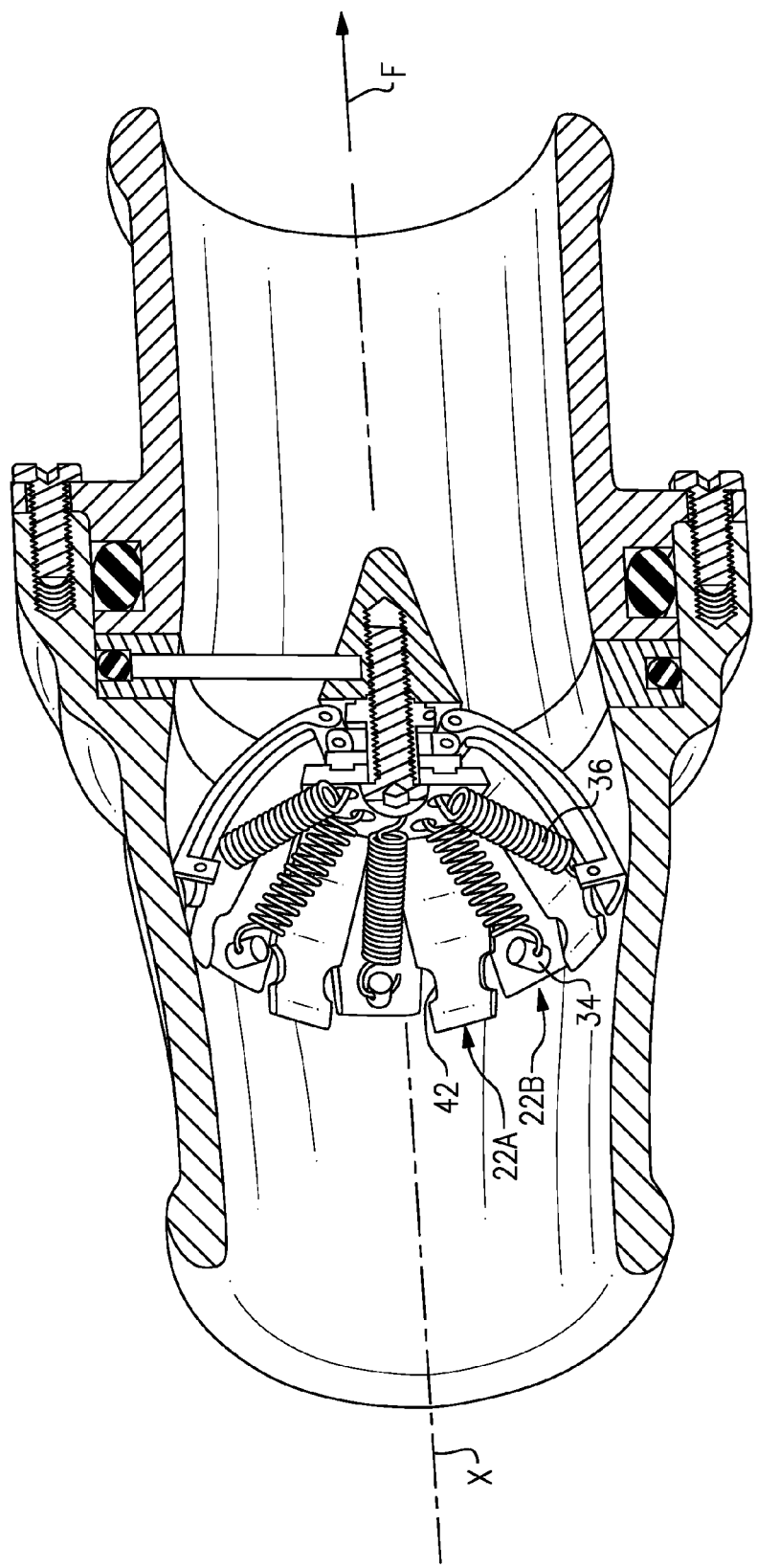
FIG. 3B is a perspective longitudinal sectional view of a fluid circuit breaker in an open obstructed flow condition.

In operation, the fluid flow readily passes over the plurality of petals 22 when the fluid circuit breaker 20 is in the closed un-obstructed flow condition (FIG. 3A). The fluid circuit breaker 20 provides an essentially negligible pressure drop. In one example, a nominal flow condition may be 4.3 psia, 70 deg F., oxygen gas, 6 cfm in which the pressure drop across the plurality of petals 22 produces an opening force of 0.012 lbf while the bias system 24 produces a force of 0.069 lbf. With this force imbalance in favor of the bias system 24, the plurality of petals 22 remain in the ultra-low pressure drop configuration.

In the event of, for example, a severed hose, the fluid flow increases the aerodynamic lift and the stagnation pressure on the plurality of petals 22. The fluid circuit breaker 20 generally relies upon aerodynamic lift over the plurality of petals 22 as a forcing function to overcome the bias system 24. In one example, a severed hose condition may be 4.3 psia, 70 deg F., oxygen gas, gas venting to 0 psia in which the pressure drop across the plurality of petals 22 produces an opening force of 0.384 lbf as compared to the bias system 24 which produces a force of 0.069 lbf. With this force imbalance in favor of the fluid flow operation on the plurality of petals 22, the fluid circuit breaker 20 actuates into the low-flow condition (FIG. 3B). In one example, the fluid circuit breaker 20 remains closed for nominal operation at approximately 6 CFM (Cubic Feet per Minute), a severed hose results in approximately 8 CFM which actuates the fluid circuit breaker 20 into the low-flow condition which results in an approximately 1 CFM low-flow condition.

Once the connector valve is closed on the severed hose, the bias system 24 returns the fluid circuit breaker 20 to the ultra-low pressure drop configuration (FIG. 3A). That is, the fluid circuit breaker 20 provides a crewmember time to shut a connector to the severed hose and avoid rapid decompression.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed:

1. A fluid circuit breaker comprising:
   a plurality of petals defined about an axis, said plurality of petals movable between an open obstructed flow condition and a closed un-obstructed flow condition;
   a plurality of springs, each of said plurality of springs attached to a first set of said plurality of petals, said first set of said plurality of petals outboard of a second set of said plurality of petals, said plurality of springs operable to maintain said plurality of petals at said closed un-obstructed flow condition below a predetermined flow velocity.

2. The fluid circuit breaker as recited in claim 1, wherein said plurality of petals define an at least partial cup shape directed opposite a predefined fluid flow direction.

3. The fluid circuit breaker as recited in claim 1, wherein said plurality of petals define a frustro-conical shape.

4. The fluid circuit breaker as recited in claim 1, wherein said plurality of petals define a circumferential airfoil shape defined along said axis.

5. The fluid circuit breaker as recited in claim 1, wherein said plurality of petals are each pivoted relative to a support structure.

6. The fluid circuit breaker as recited in claim 5, wherein said support structure is downstream of said plurality of petals relative to a predefined fluid flow direction.

7. The fluid circuit breaker as recited in claim 6, wherein said support structure is mounted to a coupling operable to receive a hose.

8. A fluid circuit breaker comprising:
   a plurality of petals defined about an axis, said plurality of petals movable between an open obstructed flow condition and a closed un-obstructed flow condition; and
   a bias system attached to said plurality of petals to maintain said plurality of petals at said closed un-obstructed flow condition below a predetermined flow velocity, said bias system includes a plurality of springs, each of said plurality of springs attached to every other of said plurality of petals.

9. The fluid circuit breaker as recited in claim 8, wherein said plurality of petals are each pivoted relative to a support structure downstream of said plurality of petals, each of said plurality of springs mounted between every other of said plurality of springs and said support structure.

10. The fluid circuit breaker as recited in claim 1, wherein said bias system includes a plurality of springs, each of said plurality of springs attached to a first set of said plurality of petals, said first set outboard of a second set of said plurality of petals.

11. The fluid circuit breaker as recited in claim 10, wherein said first set of said plurality of petals at least partially overlaps said second set of said plurality of petals.

12. A quick disconnect coupling comprising:
   a conduit;
   a support structure mounted to said conduit;
   at least three petals defined about an axis, said plurality of petals movable between an open obstructed flow condition and a closed un-obstructed flow condition relative to said support structure, said at least three petals and said support structure define a tear drop shape in said closed un-obstructed flow condition; and
   a bias system attached to said at least three petals to maintain said plurality of petals at said closed un-obstructed flow condition below a predetermined flow velocity.

13. The quick disconnect coupling as recited in claim 12, wherein said support structure is downstream of said at least three petals relative to a predefined fluid flow direction.

14. The quick disconnect coupling as recited in claim 12, wherein said conduit includes a two-piece conduit, said support structure mounted to said conduit adjacent an intersection between said two-piece conduit with a vane transverse to a fluid flow direction.

15. The quick disconnect coupling as recited in claim 12, wherein said at least three petals are centered within said conduit.

16. The quick disconnect coupling as recited in claim 12, wherein said conduit communicates with a space suit.

17. A method of minimizing rapid depressurization of a pressurized system comprising:

opening a plurality of petals against a bias system in response to a fluid flow above a predetermined flow velocity, the bias system includes a plurality of springs, each of the plurality of springs attached to a first set of the plurality of petals, the first set of the plurality of petals outboard of a second set of the plurality of petals, the plurality of springs operable to maintain the plurality of petals at a closed un-obstructed flow condition below the predetermined flow velocity.

18. The method as recited in claim 17, further comprising: directing the plurality of petals into the fluid flow to provide a cup-shape.

19. The method as recited in claim 17, further comprising: aerodynamically tailoring the plurality of petals to open against the bias system above the predetermined flow velocity.

\* \* \* \* \*